United States Patent
Ainslie et al.

[15] 3,690,235
[45] Sept. 12, 1972

[54] CAMERA FORMAT

[72] Inventors: Dianne B. Ainslie; Arthur H. Crapsey, Jr., both of Rochester, N.Y. 14650

[73] Assignee: Eastman Kodak Company, Rochester, N.Y.

[22] Filed: July 23, 1970

[21] Appl. No.: 57,663

[52] U.S. Cl. .....................95/11 R, 95/19, 95/31 R, 352/72, 352/242
[51] Int. Cl. ........................G03b 17/17, G03b 17/02
[58] Field of Search.................95/11 R, 31 R, 15–17, 95/19; 352/72, 73, 94, 65, 242

[56] References Cited

UNITED STATES PATENTS

| | | | |
|---|---|---|---|
| 3,045,572 | 7/1962 | Kinnard | 95/31 X |
| 3,478,662 | 11/1969 | Baker | 95/15 |
| 3,548,729 | 11/1967 | Baker | 95/15 X |
| 3,479,936 | 11/1969 | Land | 95/15 X |
| 2,397,031 | 3/1946 | Merritt et al | 95/11 X |
| 1,962,031 | 6/1934 | Porter | 352/72 |
| 2,553,656 | 5/1951 | Kirby | 352/242 X |
| 2,403,733 | 7/1946 | Mainardi et al | 352/65 X |
| 1,930,498 | 10/1933 | Wright | 95/12.2 |
| 2,341,480 | 2/1944 | Schusterman | 95/12.2 |

FOREIGN PATENTS OR APPLICATIONS

| 660,416 | 9/1936 | Germany | 352/242 |
|---|---|---|---|

*Primary Examiner*—Samuel S. Matthews
*Assistant Examiner*—Robert P. Greiner
*Attorney*—Robert W. Hampton and Milton S. Sales

[57] ABSTRACT

Motion picture and still cameras for use with (1) a film cartridge of the type having a rectangular parallelepiped shaped casing with a minor depth dimension substantially smaller than the major length and width dimensions, an exposure opening in one of the smallest walls of the casing, and coaxial take-up and supply film rolls having their common axes parallel to the plane of the exposure opening and with (2) a film cartridge of the type having generally cylindrical supply and take-up chambers and means defining a film plane across which filmstrip may be advanced from the supply chamber to the take-up chamber, respectively. Each camera includes a housing having a plurality of walls forming a light-tight enclosure which defines a volume of generally rectangular parallelepiped shape with a minor depth dimension substantially smaller than the major length and width dimensions, the enclosure being adapted to removably receive such respective film cartridges. The cameras further include an optical system including a lens system and light reflector means for folding the light path from the scene along at least three optical axes to the film plane of a received cartridge. A zooming system may be imposed in at least one of the optical axes of the light path.

12 Claims, 17 Drawing Figures

PATENTED SEP 12 1972
3,690,235
SHEET 1 OF 8
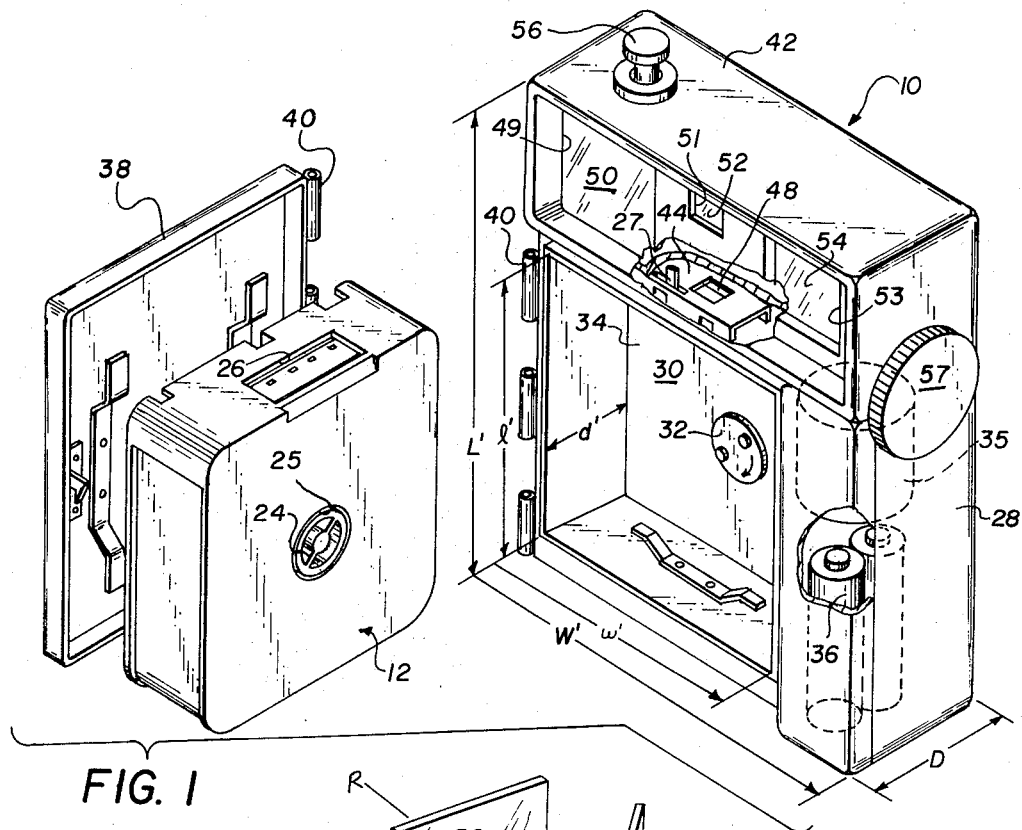
FIG. 1
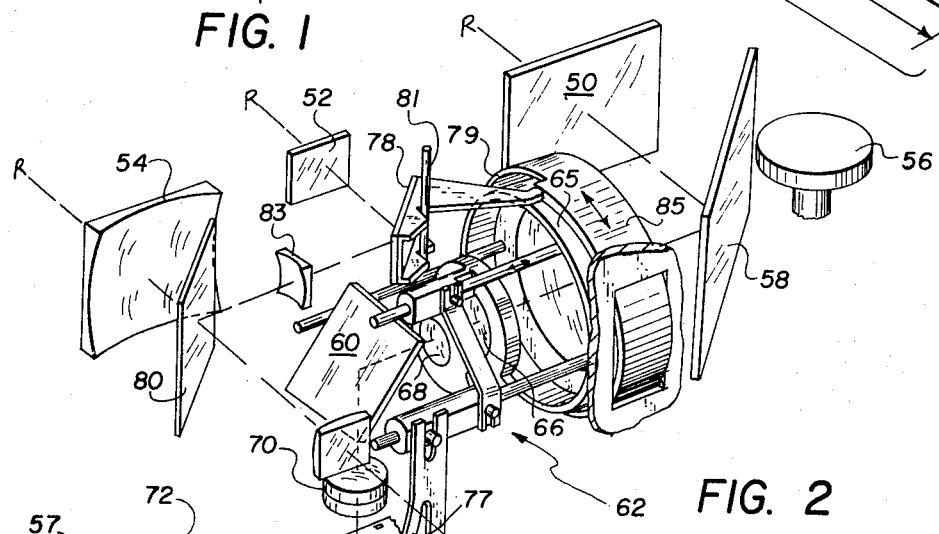
FIG. 2
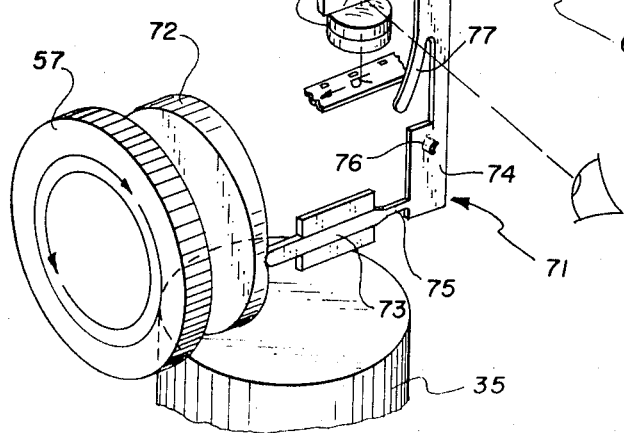
DIANNE B. AINSLIE
ARTHUR H. CRAPSEY
INVENTORS
BY *Milton S. Sales*
*Robert W. Hampton*
ATTORNEYS

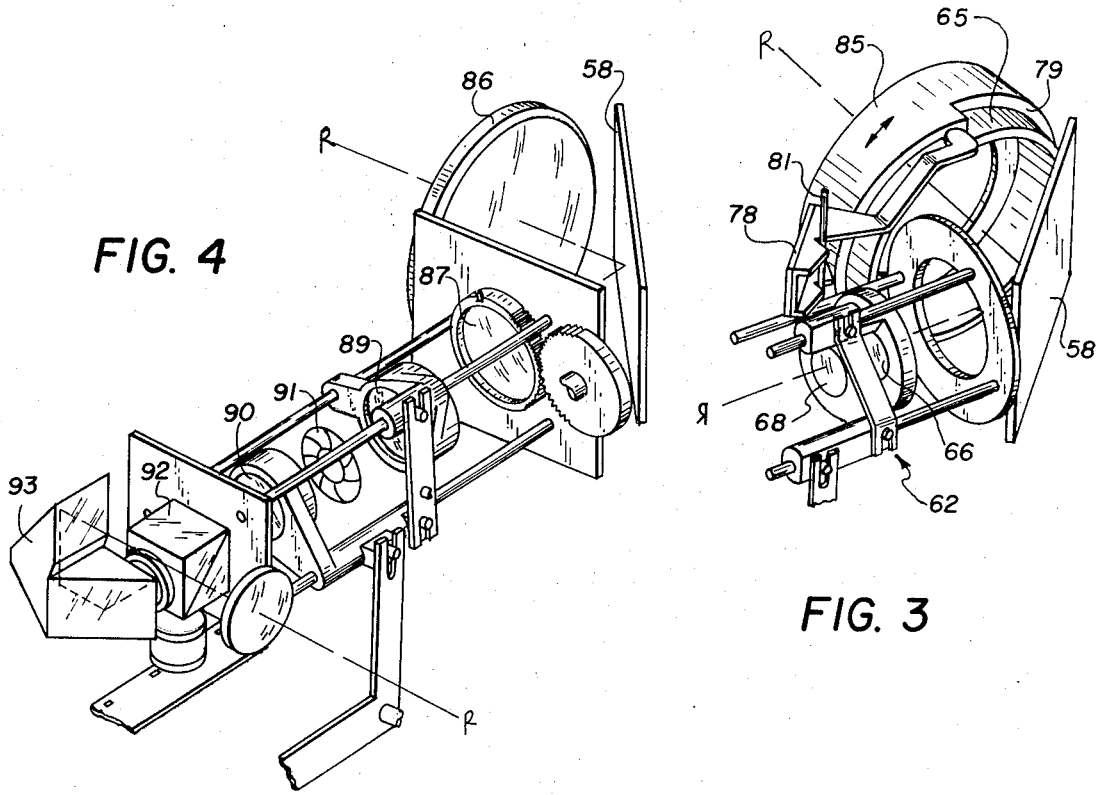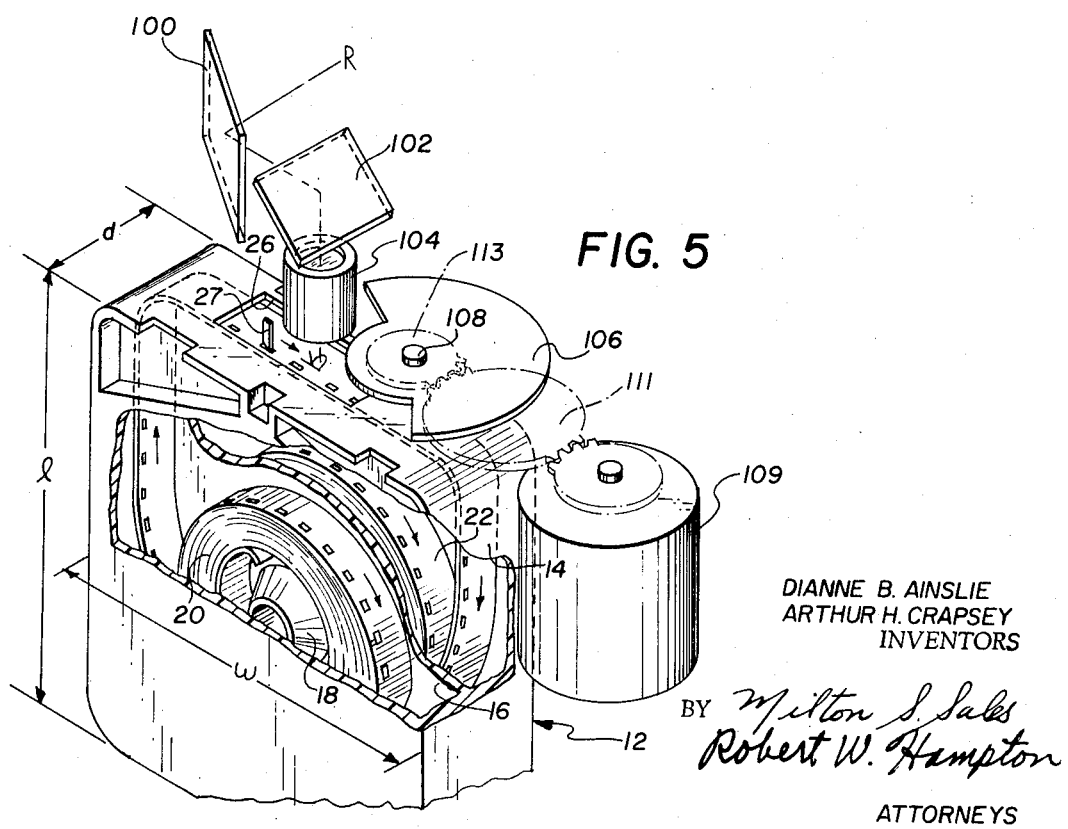

DIANNE B. AINSLIE
ARTHUR H. CRAPSEY
INVENTORS

BY Milton S. Sales
Robert W. Hampton

ATTORNEYS

DIANNE B. AINSLIE
ARTHUR H. CRAPSEY
INVENTORS

BY Milton S. Sales
Robert W. Hampton
ATTORNEYS

DIANNE B. AINSLIE
ARTHUR H. CRAPSEY
INVENTORS

BY Milton S. Sales
Robert W. Hampton
ATTORNEYS

DIANNE B. AINSLIE
ARTHUR H. CRAPSEY
INVENTORS

BY *Milton S. Sales*
*Robert W. Hampton*

ATTORNEYS

PATENTED SEP 12 1972

DIANNE B. AINSLIE
ARTHUR H. CRAPSEY
INVENTORS

BY *Milton S. Sales*
*Robert W. Hampton*

ATTORNEYS

CAMERA FORMAT

CROSS-REFERENCE TO RELATED APPLICATION

Reference is made to commonly assigned, co-pending U.S. Pat. Application Ser. No. 57,661, entitled ADJUSTING MECHANISM FOR ZOOM LENS SYSTEM, filed concurrently herewith in the name of A. H. Crapsey, and now U.S. Pat. No. 3,631,786.

BACKGROUND OF THE INVENTION

1. Field of the Invention

The present invention relates to improvements in motion picture and still cameras, and more particularly to such cameras adapted to receive film cartridges and having a folded optical path.

2. Description of the Prior Art

Amateur photography has, since the introduction of cartridge loading cameras, been substantially standardized in the case of motion picture cameras to the use of the traditional camera styling concept of a vertical forward pointing gun-type design such as shown in commonly assigned U.S. Design Pat. No. 215,124 to R. J. Olson, issued Sept. 2, 1969 and in the case of still cameras to the use of a rectangular parallelepiped shaped housing which is normally held so that the two longest dimensions are parallel to the object plane and the shortest dimension is perpendicular to such plane. The latter type camera is shown in co-assigned U.S. Pat. No. 3,353,463 to W. H. Horton et al. which issued Nov. 21, 1967.

Such motion picture cameras are customarily provided with a handle either rigidly, pivotally or removably attached to the camera housing for improved camera steadiness and operating comfort. However, the provision of handles adds bulk to the camera and does not entirely solve the problem of camera steadiness in that, even if the camera is held with two hands, the position of the hands (i.e. one above the other) is unnatural and invites camera movement. The two major dimensions of prior art still cameras are normally dictated by the size of the film cartridge while the minor dimension, i.e. the dimension parallel to the direction of incident light, is predetermined by the back focus distance of the objective. As such, cameras have until the present invention had a rather large minor dimension. The size and shape of the cameras of this format have limited the carrying convenience in that the minor dimension has been too large to permit the camera to be carried in a pocket or similar small place in the operator-s clothing. Further, because of the bulk of the camera and the position in which it is held during operation, camera steadiness has been impared, frequently resulting in blurred or unsteady pictures. By the present invention, we have provided cameras having shapes which may be comfortably held steady as the scene is photographed. To accomplish the desired result, we have found it desirable to fold the optical path from the scene to the cartridge film plane.

It has been suggested in the past to provide a folded optical part in motion picture cameras between the object and the film plane in order to permit the receipt of light from the scene along an axis substantially parallel to the film plane. U.S. Pat. No. 3,259,448 to E. M. Whitley et al., issued July 5, 1966, shows a high speed motion picture camera having feed and take-up spindles to accomodate "standard" daylight loading film spools arranged so that the axes of rotation of the spindles and spools are parallel and spaced from each other. The optical system of the Whitley et al. camera includes a series of reflectors for folding the light path from the objective to the film plane. It is noted that the Whitley et al. camera is adapted for high speed photography at frame rates of over 10,000 frames per second for scientific and industrial uses and obviously not designed to receive film cartridges of the type commonly used in amateur photography.

It also has been known that still camera size can be reduced by providing a folded optical path between the objective and the film plane such as shown in U.S. Pats. No. 3,478,662 to Baker, issued Nov. 18, 1969 and No. 3,479,936 to Land, issued Nov. 25, 1969. Such folded optical paths have not been provided for cameras adapted to receive film cartridges of the type having cylindrical supply and take-up chambers and connecting means therebetween to define a film plane. Until the present invention, the size of such cameras has been considered to be predetermined by the size of the exposure aperture in the cartridge and the camera optics.

SUMMARY OF THE INVENTION

An object of the present invention is to provide a camera of the type adapted to receive flat, rectangular parallelepiped shaped film cartridges wherein the camera size and orientation during operation provide improved steadiness.

Another object of the present invention is to provide a camera adapted to receive flat, rectangular parallelepiped shaped film cartridges wherein the camera is provided with an objective for forming an image of a scene in the primary image plane and means for directing light along a folded light path having at least three successive axes from the scene through the objective to the primary image plane whereby the camera dimensions are minimized.

Another object of the present invention is to provide a slim camera having a format particularly adapted to human factors such as improved hand support and comfort in picture taking position and controls readily available to hand position.

In accordance with the above objects, a preferred embodiment of the present invention includes a camera having means for locating within the camera a film cartridge of the type having supply and take-up chambers for receiving generally cylindrical film rolls and having means defining a film plane across which filmstrip may be advanced from the supply chamber to the take-up chamber. The camera further includes optical means for directing light along a folded path from the scene to form an image at a primary image plane.

The invention, and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is an exploded view of a motion picture camera according to the present invention and of a motion picture film cartridge received therein;

FIG. 2 is an enlarged view of a portion of the camera shown in FIG. 1, including the optical system;

FIG. 3 is an enlarged view of another embodiment of the optical system of the camera shown in FIG. 1;

FIG. 4 is an enlarged view of yet another embodiment of the optical system of the camera shown in FIG. 1;

FIG. 5 shows a perspective view of a partially broken away film cartridge and the optical system of another embodiment of the motion picture camera according to the present invention;

DESCRIPTION OF THE PREFERRED EMBODIMENTS

Figure 6:
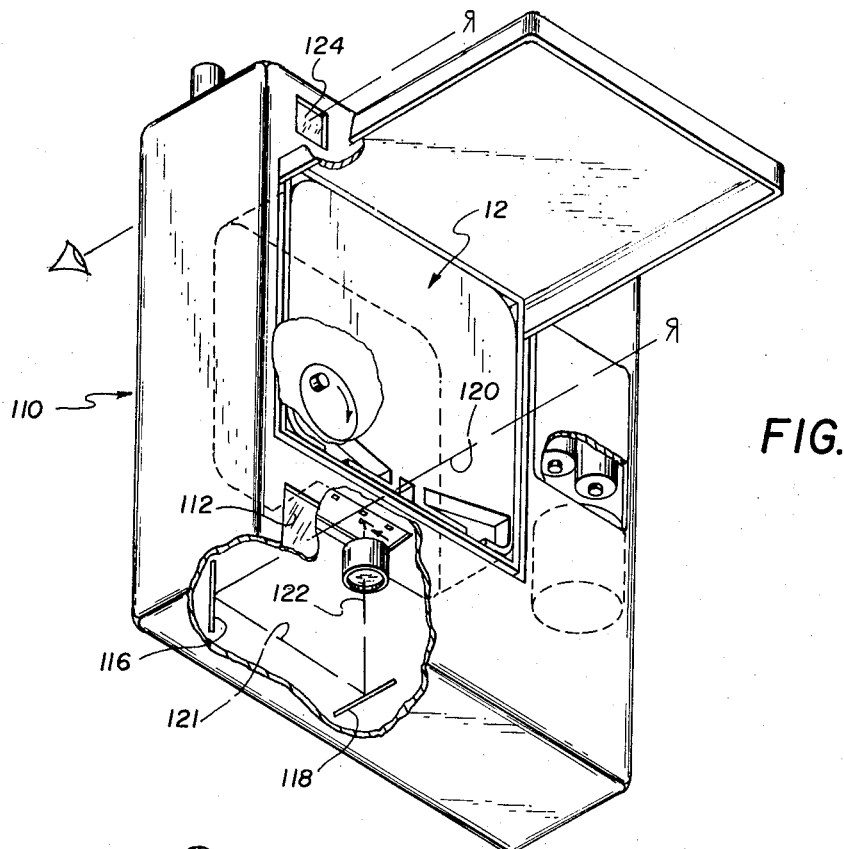
FIGS. 6–15 are partially broken away perspective views of other embodiments of the motion picture camera according to the present invention.

Because cameras are well known, the present description will be directed in particular to elements forming part of, or cooperating more directly with, apparatus in accordance with the present invention. It is to be understood that camera elements not specifically shown or described may take various forms well known to those skilled in the art.

Referring to FIG. 1, a motion picture camera 10 according to one embodiment of the present invention is adapted to receive a film cartridge 12 which in the embodiments shown is of a popular Super 8 type. Cartridge 12 is more clearly shown in FIG. 5 where it can be seen that six rectangular sides form a rectangular parallelepiped shaped casing 14 having a minor depth dimension $d$ which is substantially smaller than its major length and width dimensions $l$ and $w$, respectively. In a commercially available cartridge, dimensions $d$, $l$ and $w$ are approximately 1 inch, 3 inches and 2 ¾ inches, respectively.

Casing 14, together with a partition 16 defines adjacent film take-up and supply chambers. The supply chamber contains a freely rotatable core 18 upon which a film supply roll 20 is wound. Similarly, a film take-up roll 22 is shown in the chamber. The core of the take-up roll is driven through a friction clutch to advance film into the take-up chamber by a pair of drive lugs 24 and 25 (FIG. 1). In passing from the supply to the take-up chamber, the film passes an opening 26 in the casing wall through which the film is exposed by light received from the scene to be photographed. The film is advanced past opening 26 by a claw 27 (also FIG. 1). Claw 27 is conventionally driven by a pulldown mechanism (not shown) powered through a gear train from motor 35.

Now referring back to FIG. 1, a camera 10 is seen to have a housing 28 formed of a plurality of walls which form a light-tight enclosure defining a volume 30 having a minor depth dimension $d'$ substantially smaller than the major length and width dimensions $l'$ and $w'$, respectively. Dimensions $d'$, $l'$ and $w'$ are slightly larger than dimensions $d$, $l$ and $w$, to permit receipt of cartridge 12 in volume 30. In accordance with the present invention, camera size and shape are such as to provide a comfortable and stable format. The camera embodiment of FIG. 1 accomplishes these desirable results by providing an optical system described in conjunction with FIGS. 2–4 which permits housing 28 to have a depth D of approximately 1 ½ inches, a length L of approximately 5 inches and a width W of approximately 4 inches. In any event, it is preferable that each of the length and width dimensions be at least twice as long as the depth dimension.

A drive member 32, which is positioned to cooperate with drive lugs 24 and 25, extends into volume 30 through a rear partition 34. Drive member 32 is connected on the other side of partition 34 to a drive motor 35 positioned adjacent volume 30 for advancing film to take-up roll 22. The connection between drive member 32 and motor 35 is not shown, but would preferably consist of a series of gears, the design of which would readily occur to a person skilled in the art. The motor and other camera mechanisms are powered by a set of batteries 36 also housed beside volume 30. Volume 30 is closed by a door 38 which is hingeably attached to camera housing 28 at 40.

Camera 10 has an upper compartment 42 which has been provided for the optical system for the camera and for much of the conventional camera operating mechanism. A partition 44 is positioned between upper compartment 42 and housing volume 30 and defines an exposure aperture 48 through which light entering camera 10 through an opening 49 may pass to expose the film below aperture 48. Opening 49 has a transparent cover 50.

Camera 10 is provided with two other openings besides opening 49, namely opening 51 which is provided for the camera range finder and opening 53 which is provided for the viewfinder. Of course there is an opening behind the camera through which the operator views the scene.

The camera is actuated by manually depressing a push button 56 and, in the case of a camera provided with a zoom lens, the lens may be zoomed manually by turning a knob 57.

Referring to FIG. 2, an optical system for directing light from the scene along a folded path to form an image at the primary image plane of the camera shown in FIG. 1 is disclosed. The optical system shown in FIG. 2 comprises a pair of mirrors 58 and 60 with a zoom portion 62 interposed between the mirrors. Zooming portion 62 comprises an objective 64 held in axially movable lens mount 65, a zooming component 66, and a compensating component 68. Light which enters camera 10 from the object or scene through protective cover 50 falls upon mirror 58 which reflects the light through objective 64 and zooming and compensating components 66 and 68, respectively, to mirror 60. Mirror 60 in turn reflects the light through a relay objective 70 to the film below exposure opening 26 in cartridge 12. The parameters of the optical system require special attention in order to provide a desired focal length range with an overall size commensurate with the camera format shown in FIG. 1 and with the objects of the present invention. Another embodiment of the optical system is described with relation to FIG. 4, that system per se being no part of the present invention.

Zoom control is accomplished by turning zoom knob 57 which positions a zoom lever 71 preferably formed of flexible plastic material. Zoom knob 57 has a double ramp 72 with telephoto and wide angle positions juxtaposed at 180° with a smooth detent at each position. This permits 360° rotation in either direction with detectable stops at the telephoto and wide angle positions. Zoom lever 71 has two portions 73 and 74 connected by necked region 75 which permits relative angular movement of portions 73 and 74.

Portion 74 is pivotally mounted on the camera housing at 76 and has a resilient portion 77 which presses sideways against a stationary housing abutment (not shown) to rotate lever 71 clockwise about pivot 76, thereby holding portion 73 against cam surface 72. By turning zoom knob 57, zooming and compensating components 66 and 68, respectively, are moved by rotating portion 74 of lever 71. A more detailed description of the zoom control mechanism can be found in commonly assigned, co-pending U.S. Pat. Application Ser. No. 57,661 filed concurrently herewith in the name of A. H. Crapsey.

Objective 64 of zoom portion 62 and its mount 65 are moved axially to adjust the camera focus by rotatable ring 85 which extends through the rear wall of the camera so that it can be turned by the operator's right thumb. Rotation of ring 85 moves objective 64 axially by means of a conventional cam and follower arrangement, not shown.

A ranging mirror 78 is coupled to ring 85 by a cam 79 and pivots about a rod 81 as the ring is turned. The object to be ranged on is reflected by mirror 78 through a lens 83 to the surface on a half-silvered mirror 80 where it is super-imposed upon the same object seen by the finder and reflected through the system to the eye.

Because of the novel formats of the camera according to the present invention, the viewfinder can be much shorter than in conventional cine cameras and, as such, occupies much less volume. For example, a finder with 0.8× magnification, projected frame and capable of a field of view for a 7mm taking lens may occupy only 0.4 cubic inch. If focal length is long enough and minimum cost is desired, a straight through tunnel may be used with plane glass covers front and rear. For shorter focal length lenses, a reversed Galilean finder of the type well known in still photography arts may be used. In either case, zoom compensation will be desirable in instances where the camera is equipped with zoom capability. This may be accomplished by either a conventional variable frame mechanism to define a field angle corresponding to that of the objective or by a conventional zoom finder coupled to the zoom objective.

The various controls for the camera of the present invention can be operated without removing either hand of the operator from the camera. Zoom knob 57 is lefthand operated. Focusing element 64 extends from the back of the camera where it is operated by the right thumb, and push button 56 is operated by the forefinger of the right hand.

Referring to FIG. 3, an alternate embodiment of the optical system for the camera shown in FIG. 1 is shown. In this embodiment, the objective 82 of zoom portion 62 is positioned between the scene or object and reflecting mirror 58. As in the embodiment shown in FIG. 2, mirror 58 reflects the image through zooming and compensating components 66 and 68, respectively.

The embodiment of FIG. 3 permits focusing and triggering with the forefinger of the right hand without removing the hand from the camera. Focusing ring 85 may extend through the side wall of the camera or may protrude from the camera front. Note that there is no need for a protective cover such as cover 50 shown in FIG. 2, objective 82 serving to protect mirror 58.

The embodiment shown in FIG. 4 incorporates an optical improvement which is no part of the present invention. The embodiment includes a reflex finder system. Light entering through a first element 86 is reflected by mirror 58 through a second element 87 which is movable by turning a geared knob 88. Knob 88 may extend through the rear wall of the camera. Second and third zoom components 89 and 90, respectively are spaced on either side of an adjustable diaphragm 91. The use of a beamsplitter 92 at the second fold permits the use of a simple, compact reflex viewfinder. An erecting prism 93 directs scene light to the operator's eye.

The optical systems shown in FIGS. 2–4 are arranged for cameras of the type shown in FIG. 1, i.e. cameras wherein the cartridge loads from the front. In the present application, the terms front, rear, top and bottom are used to refer to camera directions as they would occur with the camera held in a normal position to take a picture of the horizon. Thus, the front side of the camera is that side closest to the scene when a picture is taken and through which light passes into the camera interior. In FIG. 5, we have shown a portion of an optical system for a camera of similar format to that of FIG. 1 except it is intended that film cartridge 12 be inserted from the rear of the camera (the side furthest from the scene). Note that in this embodiment, the film drive system has been moved to the front of the camera and the drive motor has been repositioned on the right side of the cartridge as viewed in FIG. 5. The cartridge locating features have been modified so that the cartridge is reversed with respect to the scene from the cartridge position shown in FIG. 1. As such, mirrors 100 and 102 have been positioned to intercept light entering from the left side of the camera front and to reflect that light to the film in the cartridge. Referring back to FIGS. 1–4, it will be noted that the mirrors shown in those embodiments intercept light entering from the right side of the camera front. The different arrangement of the FIG. 5 embodiment is necessary to properly orient the image on the film.

A shutter 106 carried by a shaft 108 is provided to periodically interrupt light transmittal to the film. Shutter 106 is driven by motor 109 through gears 111 and 113. Although not shown, it will be understood that the embodiment of FIG. 5 can be provided with focusing and zooming components in a manner similar to any of the hereinbefore discussed embodiments. These features have been omitted from the drawing only for purposes of clarity.

Figure 7:
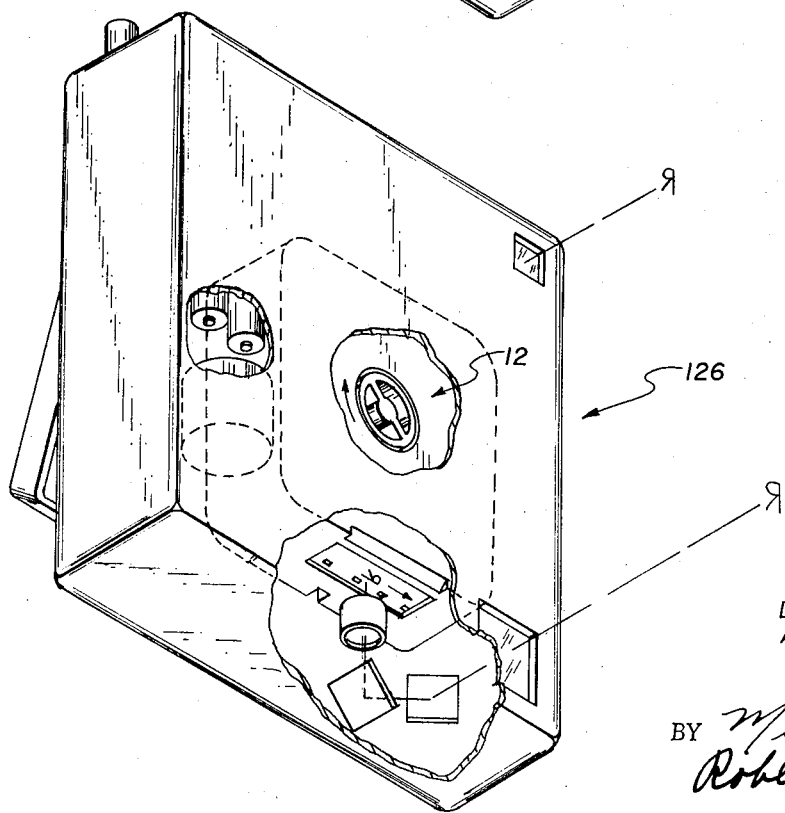

In the embodiments of FIGS. 1–5, the camera would normally be held with the longest dimension vertical and with the film plane at the top of the film cartridge in the camera and the primary image plane perpendicular to the object plane. In FIGS. 6–7 we have shown two embodiments of the camera of the present invention in which the camera is once again held with the longest dimension being vertical but wherein the film cartridge is mounted so that the film plane is at the bottom of the cartridge when in the camera. In the embodiment of FIG. 6, film cartridge 12 is inserted into camera 110 from the front. As with the earlier described embodiments, light entering the camera through a protective cover 112 is folded by mirrors 116 and 118 along three orthogonal axes 120, 121 and 122 to the cartridge film plane. Cover 112 can be omitted if mirror 116 is protected by a lens. The scene to be photographed is viewed through view-finder 124.

In FIG. 7, a camera 126 has been shown having a format similar to that of the camera embodiment of FIG. 6 except that the drive mechanism and optical system have been modified in a manner similar to that discussed with reference to FIG. 5 so that cartridge 12 may be loaded into the camera from the rear.

Figure 9:
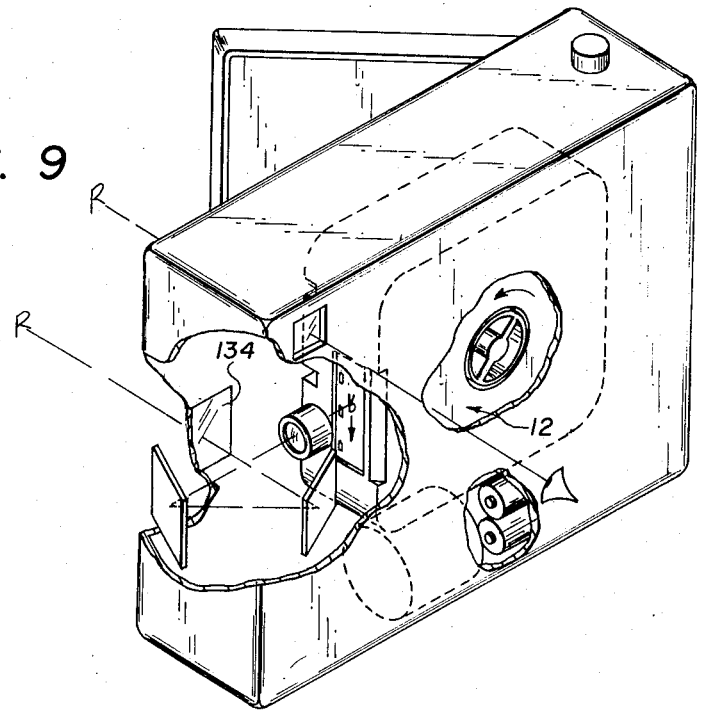
Figure 8:
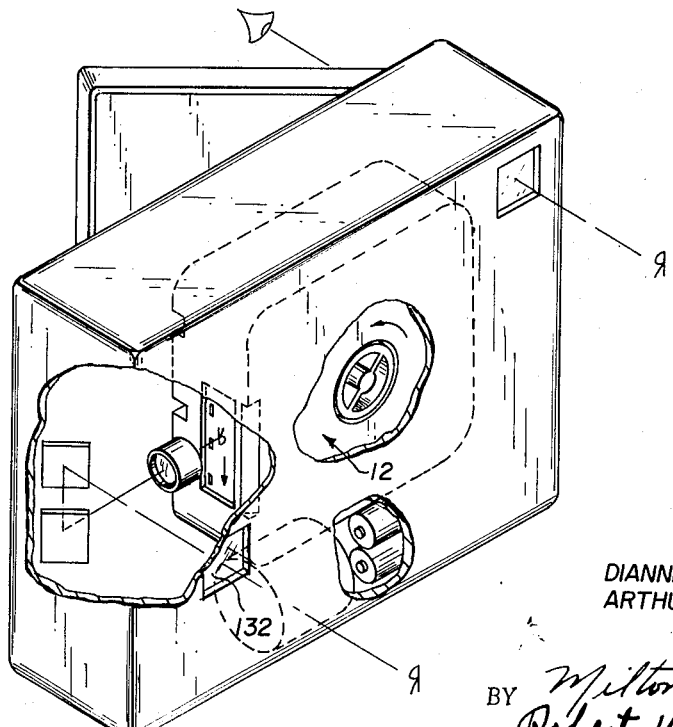

In the embodiments of FIGS. 8 and 9, the camera format is such that the operator would normally hold the camera in an orientation so that the longest camera dimension is horizontal and the shortest dimension is perpendicular to the object plane. The optics and drive mechanism of the camera shown in FIG. 8 are arranged as shown so that the camera can be loaded from the rear while the camera of FIG. 9 is loaded from the front. In each case, light entering through covers 132 and 134, respectively, is reflected by a two-mirror system through an objective to the film plane of cartridges 12. In the mirror orientation shown, the light path from the scene to the film plane does not travel over orthogonal axes, this mirror orientation being an inventive feature which may be utilized in any of the embodiments described herein.

Figure 10:
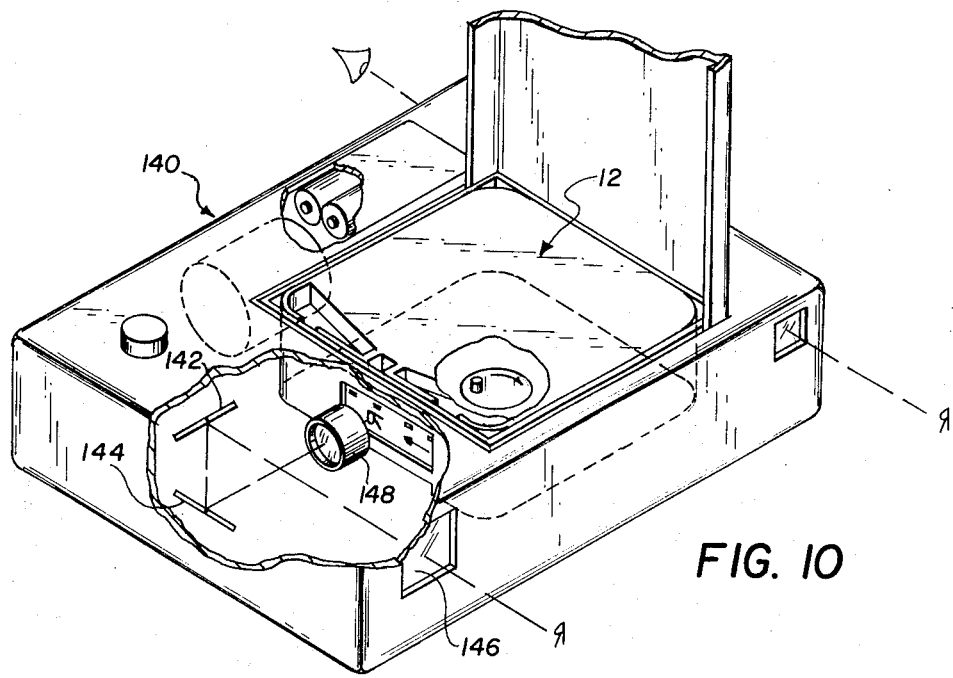
Figure 11:
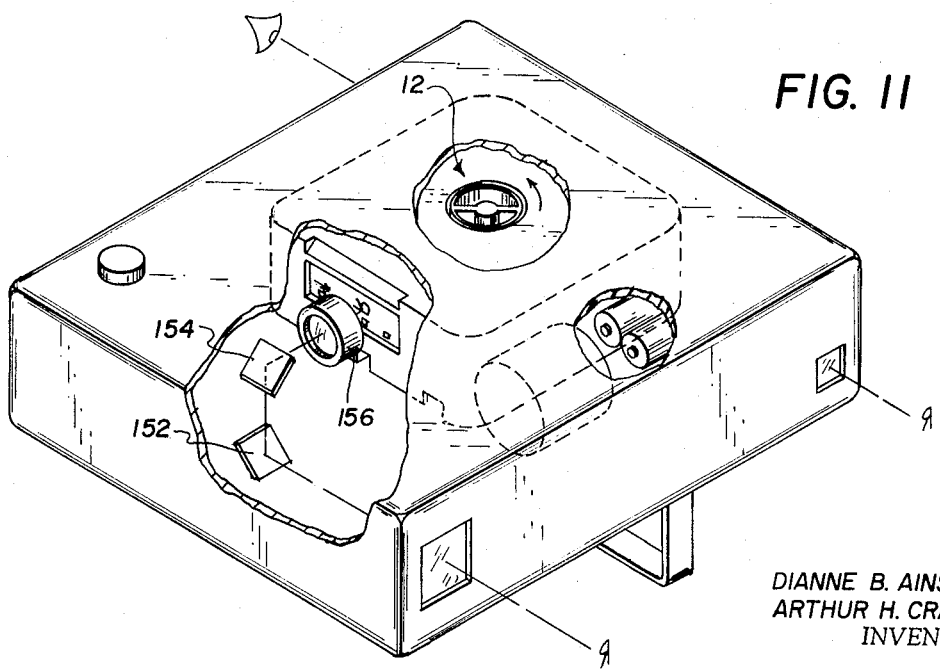

The camera embodiments shown in FIGS. 10–15 provide flat, horizontal formats wherein the two largest dimensions of the camera normally will be substantially horizontal when a picture is being taken. Such a format, as with the previously discussed formats, will provide a steadier support to help eliminate camera shake. In FIGS. 10 and 11, the film cartridge is inserted into the camera in an orientation such that the film plane is vertical and perpendicular to the object plane. In FIG. 10, camera 140 contains a pair of mirrors 142 and 144 which fold the light path so that light passing through cover 146 is directed through objective 148 to the film plane of cartridge 12. The camera shown in FIG. 11 is similar in design to that of FIG. 10 except that cartridge 12 is to be loaded from the bottom of the camera, light entering the camera through cover 150 being reflected by mirrors 152 and 154 through objective 156 to the film plane of cartridge 12.

Figure 12:
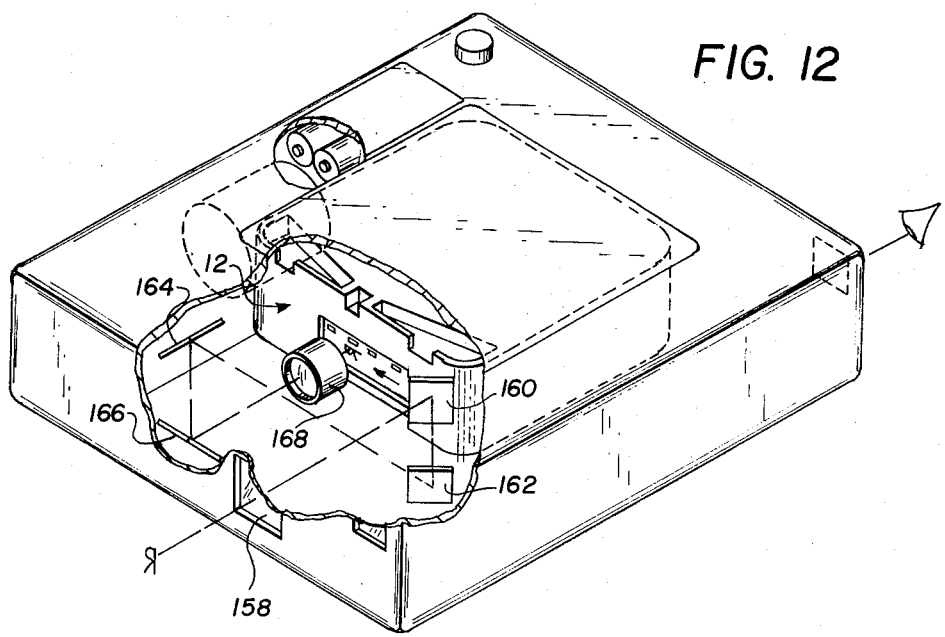
Figure 13:
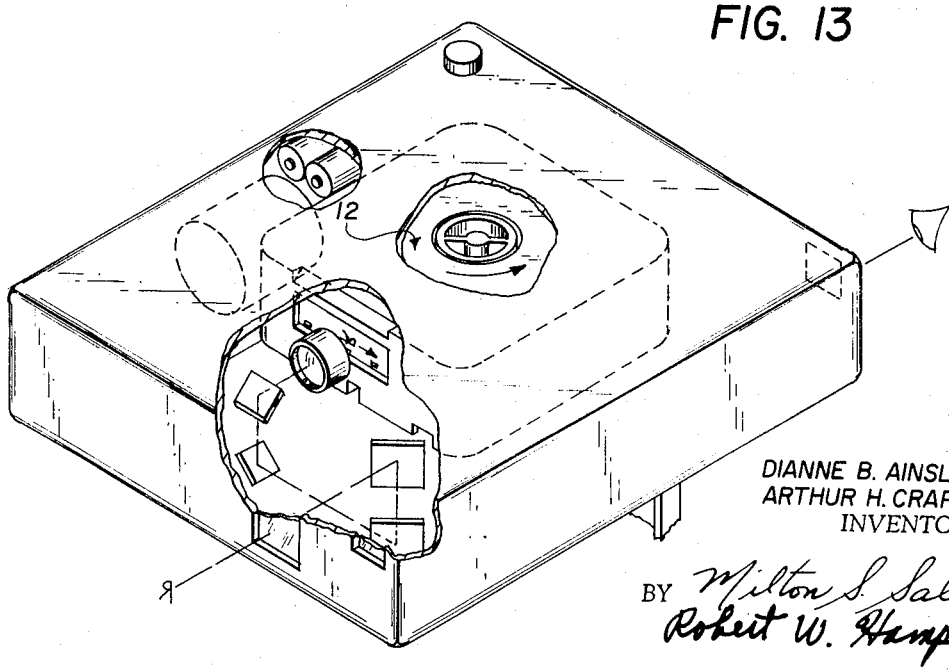

The cameras shown in FIGS. 12–15 are adapted to receive film cartridges such that the film plane of the cartridges are parallel to the object plane when a picture is being taken. In the FIG. 12 and 13 embodiments, the film plane is on the front side of the cartridges when they are in the camera and in the FIG. 14 and 15 embodiments, the film planes will be on the back side of the film cartridges when in the camera. In FIG. 12, light entering the camera through cover 158 will be reflected by mirrors 160, 162, 164 and 166 through objective 168 to the film plane. The camera embodiment of FIG. 13 is similar to that of FIG. 12 except that the optical system has been arranged so that cartridge 12 is loaded into the camera through a door at the bottom of the camera; the FIG. 12 embodiment being loaded through the top of the camera.

Figure 14:
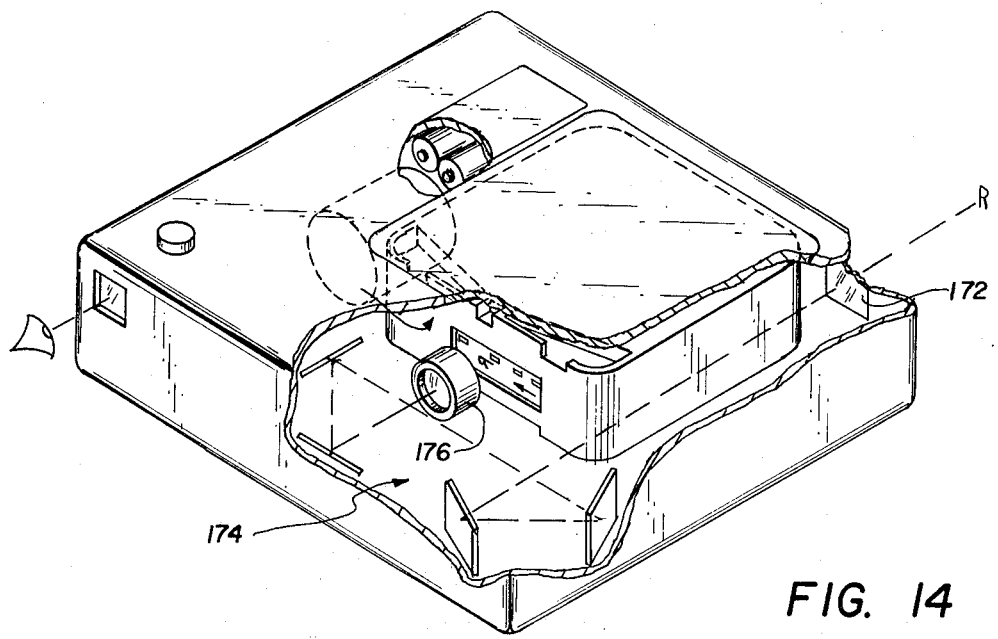
Figure 15:
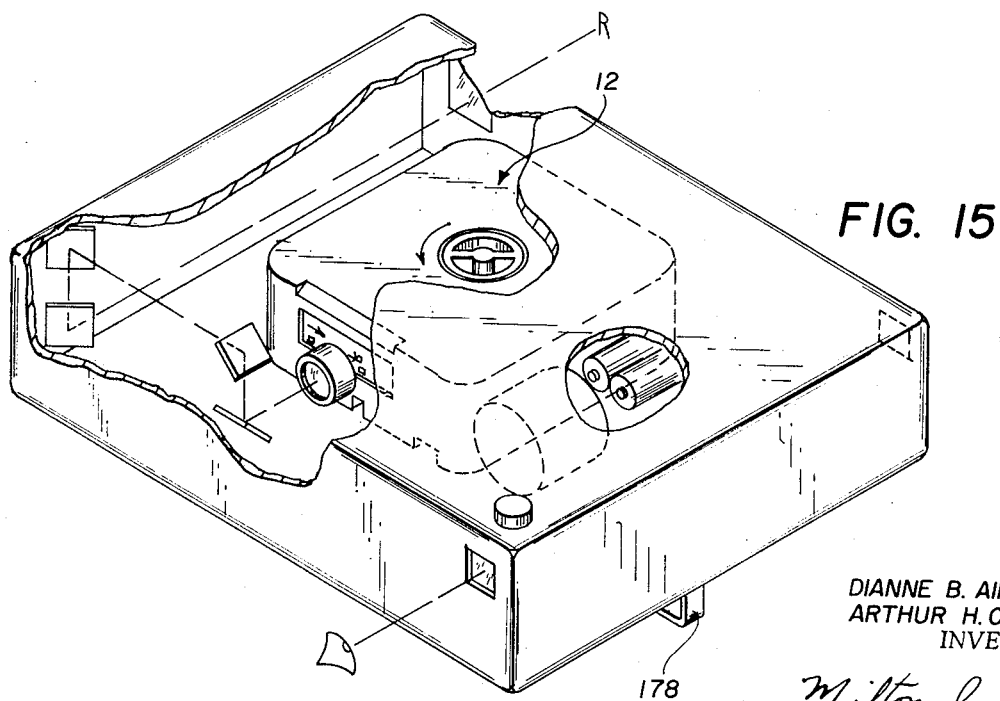

In the embodiment shown in FIG. 14, light entering camera 170 through cover 172 travels past film cartridge 12 to mirror system 174 and is reflected thereby through objective 176 to the film plane. In that embodiment, film cartridge 12 is loaded into the camera from the top while in the embodiment shown in FIG. 15, which is similar to the FIG. 14 embodiment, film cartridge 12 is inserted in the camera through a door 178 at the bottom and the optics are so arranged.

Figure 16:
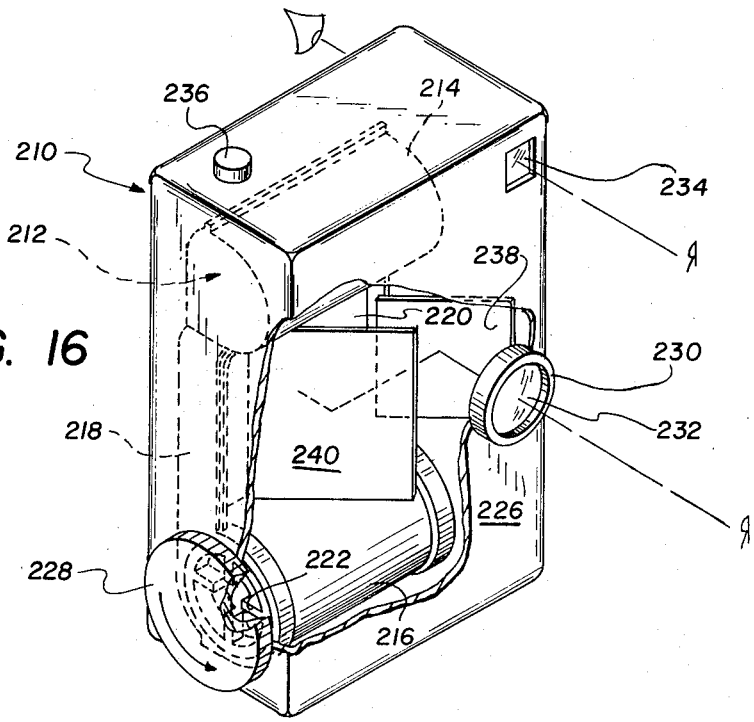
FIG. 16 is a partially broken away perspective view of a still camera according to the present invention.

A still camera 210 shown in FIG. 16 and according to another embodiment of the present invention is adapted to receive a film cartridge 212. In the embodiments shown in FIGS. 16 and 17, cartridge 212 is of the popular Size 126 type described in co-assigned U.S. Pat. No. 3,318,081 to H. Nerwin issued June 23, 1964. Cartridge 212 comprises cylindrical film supply and take-up chambers 214 and 216, respectively, and a connecting portion 218 which defines a film plane across which a filmstrip 220 may be advanced by a core (not shown) in take-up chamber 216, the end 222 of the core being shown in FIG. 16.

Camera 210 of FIG. 16 comprises a housing 224 having a front wall 226, a back wall (not shown) which would normally be provided with a door for inserting film cartridges, and front, side, top and bottom walls. A winding knob 228 is provided for advancing film 220 from supply chamber 214 to take-up chamber 216 of cartridge 212 by any suitable mechanism, such mechanisms being well known to those skilled in the art. Front wall 226 of camera 210 is provided with a lens mount 230 which carries the camera objective 232. Lens mount 230 is shown protruding slightly beyond wall 226, but it could of course be flush or recessed. A viewfinder cover 234 is provided in front wall 226 and a viewfinder system of any conventional structure is contained therebehind. A trigger release button 236 extends from the top of camera 210.

Figure 17:
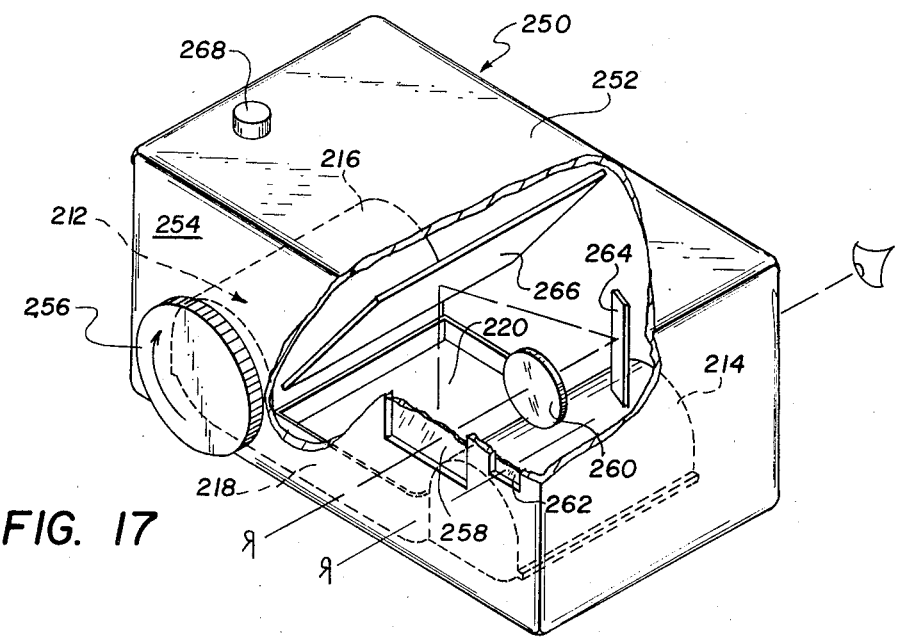
FIG. 17 is a partially broken away perspective view of another embodiment of the still camera according to the present invention.

Light entering the camera through objective 232 is reflected by first surface mirrors 238 and 240 to the film plane of a received film cartridge. By folding the light path in this manner, the distance normal to the film plane between the film plane and objective 232 can be greatly reduced so that the dimension of the camera in that direction is suitable for convenient storage and operation. As seen in FIG. 16, the camera would normally be held in such a manner that the largest dimension is vertical and the shortest dimension extends from front to back of the camera. However, by relocating push button 236 to one of the sides of the camera, it would be convenient to hold the camera so that the longest dimension is substantially horizontal when a picture is being taken. The shape of the picture would not be affected since Size 126 negatives are square. Another embodiment of the present invention is shown in FIG. 17 in which a camera 250 is provided with a rectangular parallelepiped housing 252 which is adapted to receive film cartridges 212 of the size 126 type described above with reference to the embodiment of FIG. 16. The front wall 254 of camera 250 is provided with a film advance knob 256, a cover 258 through which light passes to objective 260 and a cover 262 for the viewfinder. Light passing through objective 260 is reflected by first surface mirrors 264 and 266 to the film plane of a received cartridge such as shown at 212. A push button 268 extends from the top wall of camera 250 for releasing the shutter mechanism to take a picture. The bottom wall of camera 250 is provided with a door (not shown) for loading and removing cartridges.

In operation, the camera normally is held so that the longest dimension is horizontal and parallel to the object plane and the shortest dimension vertical. Held in this position, the camera may be rigidly supported, reducing camera shake and thus eliminating to a large extend blurred pictures.

It will be noted that in the illustrated embodiments, the camera format is such that the primary image plane is perpendicular to the object plane in the embodiments shown in FIGS. 1–11 & 17 and is parallel to the object plane in the embodiments shown in FIGS. 12–16.

The invention has been described in detail with particular reference to preferred embodiments thereof, but it will be understood that variations and modifications can be effected within the spirit and scope of invention.

We claim:

1. A camera adapted to receive a film cartridge of the type having a casing, take-up and supply chambers for receiving generally cylindrical film rolls having substantially parallel axes, and an exposure opening defined by the casing and lying in a plane parallel to the axes of the film rolls, said camera comprising:
   film gate means defining an exposure aperture;
   means for locating such film cartridges in the camera so that the opening of a received cartridge is in a plane parallel to the plane of and adjacent said exposure aperture, whereby film in such a cartridge may be exposed by light passing through said aperture and the exposure opening;
   means for folding the light path from the scene to said aperture along at least three successive axes, the one of said three axes furthest from said aperture being substantially parallel to said plane of said aperture; and
   a lens system for imaging light from a scene upon the film through said aperture, said lens system including zooming and compensating lens components positioned along the next to last of said successive axes of said light path taken in a direction of light travel towards said aperture.

2. A camera as defined in claim 1 wherein the one of said three axes furthest from said aperture is parallel to the axes of the film rolls of a received cartridge.

3. A camera as defined in claim 1 wherein the one of said three axes furthest from said aperture is perpendicular to the axes of the film rolls of a received cartridge.

4. A camera as defined in claim 1 wherein:
   said three axes are substantially orthogonal; and
   the second of said three axes taken in the direction of light travel towards said aperture is parallel to said plane of said aperture.

5. A camera as defined in claim 1 wherein:
   said three axes are substantially orthogonal;
   the second of said three axes taken in the direction of light travel towards said aperture is parallel to said plane of said aperture; and
   said first axis is parallel to the axes of the film rolls.

6. A camera as defined in claim 1 wherein:
   said three axes are substantially orthogonal;
   the second of said three axes taken in the direction of light travel towards said aperture is parallel to said plane of said aperture; and
   said first axis is perpendicular to the axes of the film rolls.

7. A motion picture camera adapted to receive a film cartridge of the type having a casing, coaxial film supply and take-up rolls, and an exposure opening defined by the casing and lying in a plane parallel to the common axis of the film rolls, said camera comprising:
   a housing;
   film gate means in said housing for supporting film from a received cartridge and defining an exposure aperture in a plane parallel to the plane of and adjacent the opening of a received cartridge, whereby film in such a cartridge may be exposed by light passing through said aperture and the exposure opening;
   means for transporting film supported by said film gate means past said aperture;
   means defined by said housing for admitting light from a scene to be photographed to the interior of said housing along a first optical axis generally parallel to the plane of said aperture;
   means oriented in said housing to reflect light passing through said light admitting means along a path including at least three successive axes and through said aperture; and
   zooming and compensating lens components in the next to last of said successive axes of said light path taken in the direction of light travel towards said aperture.

8. A motion picture camera as defined in claim 7 wherein said first optical axis is parallel to the common axis of the rolls of a received cartridge.

9. A motion picture camera as defined in claim 7 wherein said first optical axis is perpendicular to the common axis of the rolls of a received cartridge.

10. A motion picture camera as defined in claim 7 wherein said light reflecting means includes two mirrors and said three successive axes are orthogonal, the first and second such orthogonal axes taken in the direction of light travel towards said aperture being parallel to said plane of said aperture.

11. A motion picture camera adapted to receive film cartridges having a plurality of sides defining a volume of generally rectangular parallelepiped shape with a minor depth dimension substantially smaller than major length and width dimensions thereof and further having an exposure opening in one of the sides parallel to the depth and width dimensions, said camera comprising:
   a housing having a plurality of walls forming a light-tight enclosure which defines a volume of generally rectangular parallelepiped shaped with a minor depth dimension substantially smaller than major length and width dimensions, said enclosure being adapted to removably receive such film cartridges oriented so that said one side of a received cartridge faces toward but is spaced from one of said walls of said housing which is parallel to said depth and width dimensions of said housing volume, wherein a space is formed between the one side of a received cartridge and said one wall of said housing;

means in said housing for defining at least a portion of a film gate formed to support a length of film from a received cartridge in a substantially flat exposure plane parallel to said one wall of said housing;

means at least partially in said space for folding the light path from the scene to said exposure plane along at least three successive axes, the first of said three successive axes taken in the direction of light travel towards said exposure plane being parallel to said exposure plane; and a lens system mounted in said housing for imaging light from a scene upon said exposure plane, said lens system including zooming and compensating lens components in the next to last of said successive axes taken in the direction of light travel towards said exposure plane.

12. A motion picture camera as defined in claim 11 wherein said three successive axes are substantially orthogonal and the second of said successive axes taken in the direction of light travel towards said exposure plane is parallel to said exposure plane.

* * * * *